(12) United States Patent
Eltabakh et al.

(10) Patent No.: US 10,997,168 B2
(45) Date of Patent: May 4, 2021

(54) MANAGEMENT OF SOFT CORRELATION FOR DATABASES AND OPTIMIZATION OF DATABASE QUERIES

(71) Applicant: Teradata US, Inc., Dayton, OH (US)

(72) Inventors: Mohamed Yassin Eltabakh, Worcester, MA (US); Grace Kwan-On Au, Rancho Palos Verdes, CA (US); Sanjay Nair, El Segundo, CA (US); Mohammed Al-Kateb, Rolling Hills Estates, CA (US); Paul Laurence Sinclair, Manhattan Beach, CA (US)

(73) Assignee: Teradata US, Inc., San Diego, CA (US)

( * ) Notice: Subject to any disclaimer, the term of this patent is extended or adjusted under 35 U.S.C. 154(b) by 245 days.

(21) Appl. No.: 16/218,689

(22) Filed: Dec. 13, 2018

(65) Prior Publication Data

US 2020/0192893 A1 Jun. 18, 2020

(51) Int. Cl.
| | |
|---|---|
| *G06F 7/02* | (2006.01) |
| *G06F 16/00* | (2019.01) |
| *G06F 16/2453* | (2019.01) |
| *G06F 16/215* | (2019.01) |
| *G06F 16/11* | (2019.01) |
| *G06F 16/28* | (2019.01) |
| *G06F 16/22* | (2019.01) |

(52) U.S. Cl.
CPC ......... *G06F 16/2453* (2019.01); *G06F 16/11* (2019.01); *G06F 16/215* (2019.01); *G06F 16/2272* (2019.01); *G06F 16/28* (2019.01)

(58) Field of Classification Search
CPC ............... G06F 16/2453; G06F 16/908; G06F 16/2272; G06F 16/2365; G06F 16/217; G06F 16/2282; G06F 16/215; G06F 16/28; G06F 16/11
See application file for complete search history.

(56) References Cited

U.S. PATENT DOCUMENTS

| | | | |
|---|---|---|---|
| 7,526,486 B2* | 4/2009 | Cushman, II | G06F 16/215 |
| 10,650,050 B2* | 5/2020 | He | G06F 16/217 |
| 2017/0109347 A1* | 4/2017 | Barad | G06F 16/211 |

(Continued)

OTHER PUBLICATIONS

Exploiting Soft and Hard Correlations in Big Data Query Optimization, Hai Liu, Dongqing Xiao, Pankaj Didwania, Mohamed Eltabakh, p. 1005-1016.

(Continued)

*Primary Examiner* — Bruce M Moser
(74) *Attorney, Agent, or Firm* — Ramin Mahboubian

(57) ABSTRACT

One or a soft correlation of a database can be adjusted (e.g., modified, replaced, overwritten) for use with respect to one or more record(s) of the database associated with the soft correlation, by considering at least one or more violations of the soft correlations in the one or more of records database records associated with the soft correlation. In addition, an adjusted soft correlation can be stored and used for optimizations of database queries pertaining to one or more records associated with the adjusted soft correlation. Typically, the adjusted soft correlation is adjusted by at least considering the violations of an original soft correlation in the one or more records relating to the database queries.

14 Claims, 9 Drawing Sheets

(56) References Cited

U.S. PATENT DOCUMENTS

2020/0073976 A1* 3/2020 Lecue ................. G06F 16/9024

OTHER PUBLICATIONS

Cords: Automatic Discovery of Correlations and Soft Functional Dependencies, Ihab F. Ilyas, Volker Markl Peter Haas, Paul Brown, Ashraf Aboulnaga.
Adaptive Correlation Exploitation in Big Data Query Optimization. Yuchen Liu, Hai Liu, Dongqing Xiao, Mohamed Y. Eltabakh, p. 1-25.
Correlation Maps: A Compressed Access Method for Exploiting Soft Functional Dependencies, Hideaki Kimura, George Huo, Alexander Rasin, Samuel Madden, Stanley B. Zdonik.

* cited by examiner

```
List L Empty              // List to hold the violations
List X Empty              // List to hold values that already have mappings
For each record r D Loop
    IF  r.dest != C.expr(r.src   THEN       // r is in violation
        IF  r.src X THEN
            Skip r                          // This violation cannot be reclaimed
        ELSE
            Insert (r.src, r.dest, 1) into L or increment its count if already exist
        END IF
    ELSE                                                    // r is not in violation
        Insert r.src into X unless it is already there
        Delete any entry (r.src, *, *) from L
    END IF
```

FIG. 5

MANAGEMENT OF SOFT CORRELATION FOR DATABASES AND OPTIMIZATION OF DATABASE QUERIES

BACKGROUND

Data can be an abstract term. In the context of computing environments and system, data can be generally encompassing of all forms of information that can be stored in a computer readable medium (e.g., memory, hard disk). Data and in particular, one or more instances of data can also be referred to as data object(s). As is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important aspect of database systems is optimization of the database queries of the data stored in the database as it is generally appreciated by those skilled in the art. In addition, correlation between data (data correlation) of the database can be very useful, especially with respect to optimization of the database queries of the data stored in the database. Generally, data correlation can signify a relationship between data attributes, for example, a relationship (e.g., a mapping function or expression) between a pair of database or data attributes (e.g., source and destination data attributes mapped by a mapping function).

In view of the ever-increasing need for database systems in various computing environments and systems, improved techniques for correlating data (or data correlation), especially with respect to optimization of database queries would be very useful.

SUMMARY

Broadly speaking, the invention relates to computing environments and systems. More particularly, the invention relates to techniques for management of soft correlations in database systems and environments.

In accordance with one aspect of the invention, a soft correlation of a database can be adjusted (e.g., modified, replaced, overwritten) for use with respect to one or more record(s) of the database associated with the soft correlation, by considering at least one or more violations of the soft correlations in the one or more of records database records associated with the soft correlation.

In accordance with another aspect of the invention, an adjusted soft correlation can be stored and used for optimizations of database queries pertaining to one or more records associated with the adjusted soft correlation. Typically, the adjusted soft correlation is adjusted by at least considering the violations of an original soft correlation in the one or more records relating to the database queries.

Still other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5 depicts an exemplary procedure for collecting the violation statistics for a single-to single soft correlation in accordance with one embodiment

DETAILED DESCRIPTION

Figure 1:
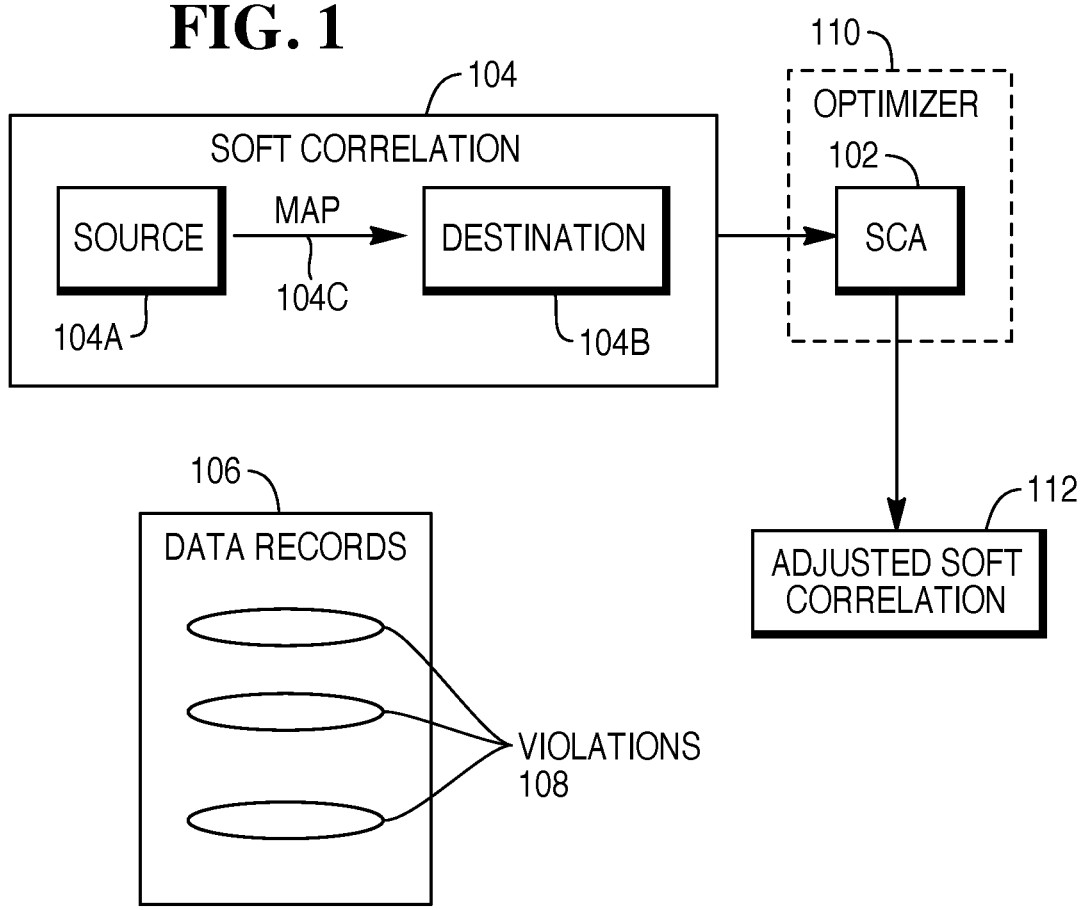
FIG. 1 depicts a soft correlation adjustment system (SCA) in accordance with one embodiment.

As noted in the background section, improved techniques for correlating data (or data correlation), especially with respect to optimization of database queries would be very useful.

Today, one prevalent example of data correlation in real-world database applications is Attribute-Pair correlation. It will be appreciated that Capturing Attribute-Pair correlations within database system and making use of them in query optimization can open up various opportunities for advanced optimizations of database systems (usually referred to as "semantic query optimization").

However, one of the more challenging types of attribute-pair correlations is "soft correlations" where the correlation semantics is not necessarily conformed all the time (100%) and there can be some violations of a soft correlation in the database. An example of a soft correlation is the following: "In most cases, ShipDate is within 1 and 10 days from OrderDate," whereas implied by the phrase: "in most cases," the correlations may not be true for some instances of data (e.g., ShipDate for a particular OderDate is 11 or more days). Soft correlations are fairly common and very useful in modern analytical applications.

However, management of soft correlations can be very challenging because they require achieving a difficult balancing act between two contradicting objectives. The first objective is to provide a mapping expression that is as "tight" as possible (i.e., captures as much as data that conforms to the underlining correlation) because "tightness" would maximize the irrelevant that can be eliminated at database query execution time when the database query is optimized, resulting in more optimized execution of the database query. In this regard, the range mentioned above [1-120] is better than [1-200] or [1-10 years]—although the latter ones are still semantically correct. The second objective is to minimize the number of violations (no confirmation of the correlation) because these violations would need special handling and processing both before and at database query execution time. In this regard and referring to the same soft correlation above, large ranges such as [1-10 years] would guarantee minimizing the violations to zero, but it would be very counterproductive with respect to the first objective, namely, maximizing the irrelevant that can be eliminated.

In view of the challenges that soft correlation present in managing more modern databases, improved techniques for management of soft correlations in database systems are disclosed. It will be appreciated that the improved management techniques can be versatile. As such, systems for Versatile Management of Soft correlations ("VeMS") of database environment and their optimization are also disclosed.

Embodiments of these aspects of the invention are also discussed below with reference to FIGS. 1-8C. However, those skilled in the art will readily appreciate that the detailed description given herein with respect to these figures is for explanatory purposes as the invention extends beyond these limited embodiments.

FIG. 1 depicts a soft correlation adjustment system (SCA) 102 in accordance with one embodiment. Referring to FIG. 1, SCA 102 can obtain (e.g., receive, identify, find, determine) a soft correlation 104. It should be noted that soft correlation 104 effectively maps a pair of database attributes, namely, a source database attribute 104A and a destination 1048 database attribute (attribute-pairs) using a mapping or mapping expression 104C. It should also be noted that the soft correlation 104 can be of various forms, including, for example, (i) a single (or singleton) source attribute to a range destination attribute (single-to-range), (ii) a single source to a list destination attribute (single-to-list), and (iii) a single source attribute to a single destination (single-to-single) type of soft correlation. For example, as a single-to-range soft correlation, a mapping can be made between a database attribute of "date of order" as a source 104A and another database range attribute of "5 to 10 days after the date or order" that can be provided in connection with a "date of shipment" in a data records (e.g., database tables) of a database as a destination database attribute 104B. This single-to-range soft correlation can signify a correlation between a pair of database attributes (or fields) in the in the data records, namely, database fields (attributes as provided in a particular data record) of "date of order" and "date of shipment." On the other hand, a single-to-list type of a soft correlation can, for example, signify a correlation of a single (or singleton) database source (e.g., "city name") to a number of possible or acceptable "state names" as a destination database attribute (or destination attribute). It should be noted that although the destination database attribute is referred to herein as a "list" the order is not necessarily important and it should not be confused with an ordered list. As such, a "list" can be considered to be a set of elements. As another example of various forms of the soft correlation 104, a single-to-single type of soft correlation can simply correlate a single (or singleton) source database attribute (e.g., airport name) to another single destination database attribute (e.g., city name).

Generally, a source database attribute can be a single source but the destination database attribute can take other forms besides a single destination, including, for example, a range destination attribute, or a set (or "list") destination attribute. It will be appreciated that the SCA 102 can effectively determine whether or not to adjust (e.g., change, overwrite, modify) the destination attribute 104B for various forms of soft correlation 104, and adjust the soft correlation 104 to generate and stored an adjusted soft correlation 1122, as will be discussed in greater detail below.

Generally, the CSA 102 can collect statistics of the volitions of the soft correlation 104 for one or more relevant data records 106 of a database (not shown). Then, the CSA 102 can effectively evaluate the collected statics of the violations (e.g., determine the extent, frequency, or the nature of violations) of the soft correlation 104. By way of example, the CSA 102 can determine the number of entries 108 in the relevant data record(s) 106 that violate the soft correlation 104. Then, the SCA 102 can determine whether to adjust the soft correlation 106 by evaluating the violations 108 found in the one or more relevant data records 106 of the database, based on one or more considerations (e.g., ratio, percentage, frequency, density of violations of a range as a plotted on a line). Accordingly, the SCA 102 can adjust the soft correlation 104 to generate an adjusted soft correlation 112 if it determines to adjust the SCA 102 based on its evaluation of the violations 108 in the one or more relevant data records 106. The adjusted soft correlation 112 can be a new soft correlation or a modified version of the soft correlation 104.

Typically, extent (or degree, or nature) of the volitions 108 of the soft correlation 104 can be evaluated in connection with finding an adjustment for the destination attribute 104B for the corresponding source attribute 104A, such that the adjustment destination attribute 104B would be better for optimization of database queries that can be made in connection of the relevant database records 106 of the database. As such, the adjusted soft correlation 108 can result in better optimization of database queries of the database than the (original) soft correlation 104 would allow. To this end, SCA 102 can, for example, be provided as a part of a database optimizer system 110 (shown in FIG. 1 by dashed lines signifying an optional implementation) as those skilled in the art will know and appreciate.

Those skilled in the art will also readily know and appreciate that the SCA 102 can, for example, be implemented by hardware or software, or a combination thereof. For example, although not shown in FIG. 1, CSA 102 can be implemented as a computer (or computing system) provided by one or more physical processors that execute executable compute code stored in a non-transitory computer readable medium (e.g., memory).

More specific operations performed the SCA 102 can depend on the particular type or form of the soft correlation 104. As such, the operations of the SCA 102 are discussed below in greater detail with respect to some exemplary forms, namely, (i) a single source attribute to a range destination attribute (single-to-range), (ii) a single source to a list destination attribute (single-to-list), and (iii) a single source attribute to a single destination (single-to-single) type of soft correlation.

Figure 2:
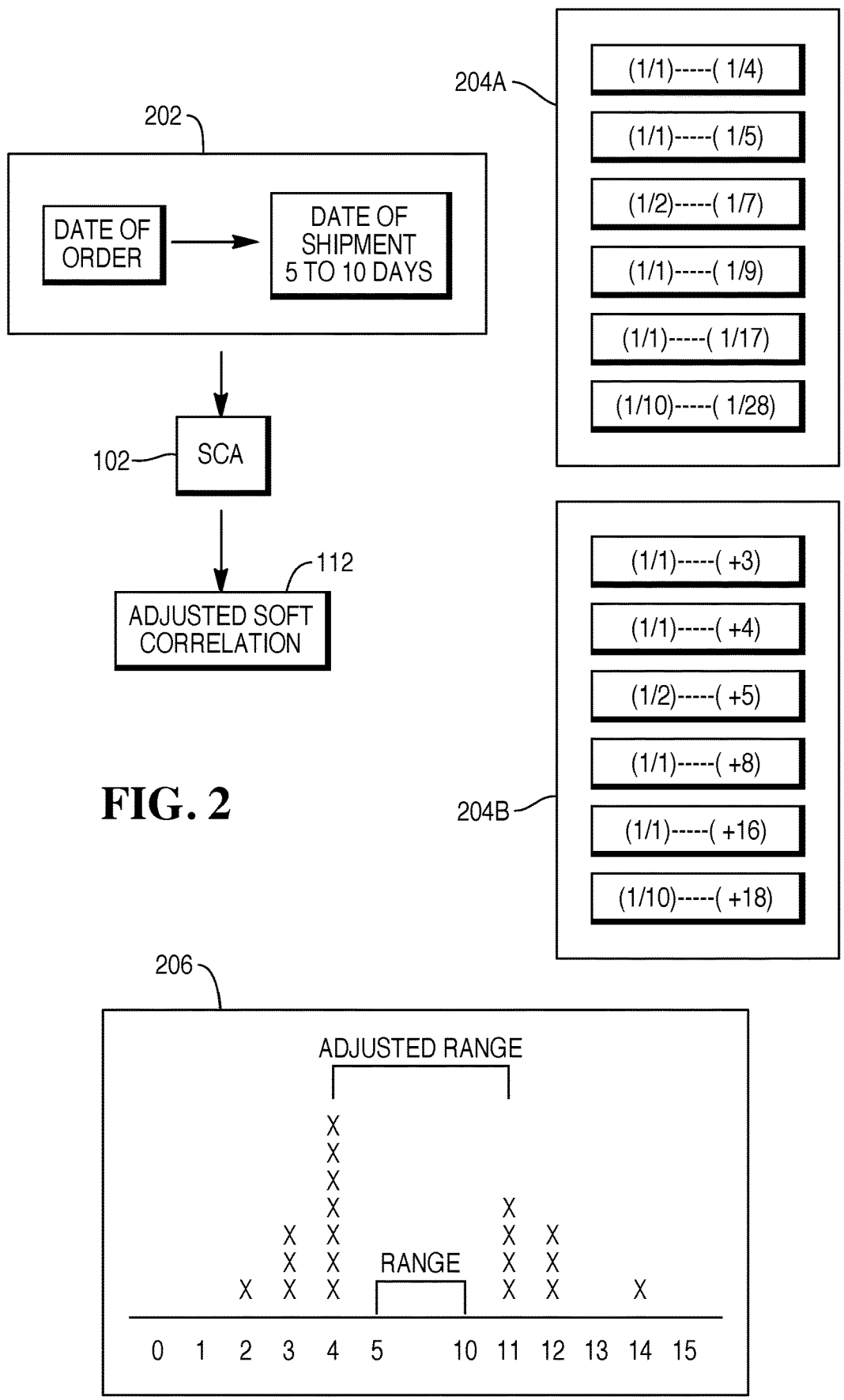
FIG. 2 depicts an exemplary soft correlation for a single-to-range type correlation that can be obtained by CSA in accordance with one embodiment.

To further elaborate, FIG. 2 depicts an exemplary soft correlation 202 for a single-to-range type correlation that can be obtained by CSA 102 (shown in FIG. 1) in accordance with one embodiment. The exemplary soft correlation 202 can be described as: "in most cases, the shipping date for an order is within 5-10 days after the date or order (or order date)." Referring to FIG. 2, the soft correlation 202 effectively maps a source destination of "date of order" 202A to a destination range (5-10 days of the order date) 202B for the "date of shipment," namely, 5-10 days after the date of order. As noted above, the operations of the SCA 102 can depend on the particular type of a soft correlation. As such, the SCA 102 (also shown in FIG. 1) can initially determine whether or not the soft correlation 202 is a single-to-range soft correlation. If that's the case, then, for each one of the one or more data records 204 of the database (shown as 204A and 204B), the SCA 102 can collect statistics of the violations of the soft correlation 202 in the one or more data records 204.

Referring to FIG. 2, a simplified version (204A) of the one or more data records 204 is depicted to show the "date of order" and "date or shipment" as may be stored initially (or in a raw form) in the database. In this simplified example of the data record(s) 204A, only months and days are shown (e.g., 1/1, 1/7). Referring to data record(s) 204A, a number of the entries in the one or more data records 204A violate the exemplary soft correlation 202 (e.g., (1/1,1/4), (1/1, 1/17), (1/10, 1/18)). A more organized (e.g., indexed) version of the one or more data records 204 is shown in FIG. 2 as one or more data records 204B, where the "date of shipment" can be provided as an index with respect to "date or order. Referring to one or more data records 204 B, a number of violations can be identified as indexes falling outside of the range of within 5 days (e.g., +3, +4, +16, +18). As such, the SCA 102 can determine whether the corresponding destination attribute is outside of the destination range of the soft correlation 106. By way of example, all the entries that fall outside of the range of 5-10 days after the date of shipment date can be identified as violations of the soft correlation 106. These volitions can, for example, include shipment dates that are 4 days (or less) after the order date, or shipment dates that are 11 days (or more) after order date.

After the violations have been determined in the one or more data records 204, the CSA 202 can determine whether to adjust the destination range of the soft correlation 106 based on one or more considerations. These considerations can, for example, include the density of the violations of the destination range of the soft correlation 106, and/or a determined or predetermined threshold of allowed violations of the destination range of the soft correlation 106, as will be discussed in greater detail below.

Referring to FIG. 2, the violations can be depicted in a line as a representation 206, where the number (or frequency) of the violations are shown for some of entries outside of the range for illustration purposes. In the example, it may feasible to extend the lower and/or upper bound of the range to capture relatively more violations by a relatively small change of the range as an adjusted range. For example, the range can be extended to 4-11 days or, 4-10 days, and so on, depending on one or more considerations, instead of the original range of 5-10 days.

Although not shown in FIG. 2, it should be noted that SCA 102 can also collect statistics for the entries that are inside the range of the soft correlation 106 (conforming data). As a result, the SCA 102 can also determine to effectively shrink a lower and/or an upper bound. This means that an adjusted soft correlation can result that may shrink or expend the lower and/or an upper bound in various ways (e.g., 4-8 days, 6-11 days, 6-12 days).

To elaborate even further, adjustment of a range is described for an exemplary single-to-range soft correlation: "In most cases, ShipDate is within 1 and 120 days from OrderDate." Initially, statistics can be collected at least on violations of the soft correlation. Formally, for a given data record $r \in D$, r is said to violate C if "r.dest" is outside the range [lower bound l, upper bound u] produced by "C.expr (r.src)." In this case, compute the smallest value δr that would make "r.dest" fall within the desired range along with a flag "−" or "+" indicating whether the shift is towards the range's lower or upper bound, respectively:

$$\delta_r = \begin{cases} ("-", l - r.dest) & \text{if } r.dest < l \\ ("+", r.dest - u) & \text{if } r.dest > u \end{cases}$$

Let $\Delta_- = \{\delta_r, \forall r \in D \& \delta_r \text{ has "−" flag}\}$ $\Delta_+ = \{\delta_r, \forall r \in D \& \delta_r \text{ has "+" flag}\}$ Next, collected statics can be exploited for correlation tuning (or adjusting) in various ways. A number of examples are discussed below.

Figure 3:
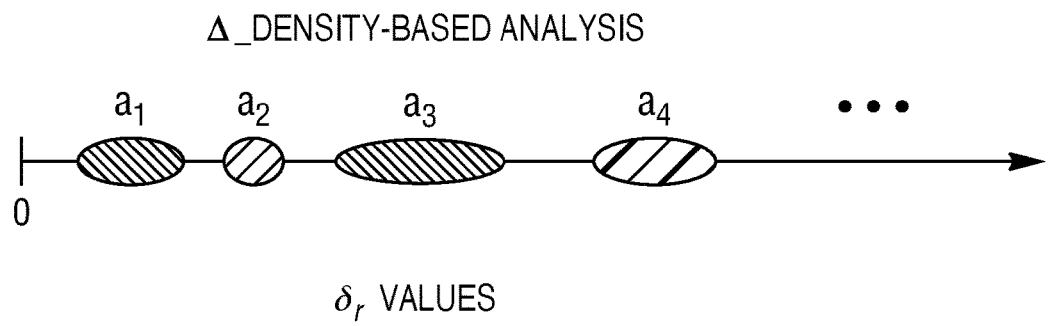
FIG. 3 depicts a view of a density-based analysis for one set in accordance with one embodiment.

Density Based Analysis: One example is to identify dense violation areas within each of the two sets Δ− and Δ+. For example, FIG. 3 depicts a view of a density-based analysis for one set in accordance with one embodiment. Dense areas that are close to the baseline (0) are the most promising areas that a Versatile Management of Soft Correlations (VeMS) mechanism or strategy can target. For example, with a relatively small expansion to C's range, all the violations in area "$a_1$" can be reclaimed. Less dense areas, e.g., $a_2$, are areas to avoid expanding-because C's tightness can get degraded without much gain—unless VeMS mechanism or strategy targets a subsequent dense area, e.g., $a_3$. The distribution and boundaries of these dense areas can, for example, be identified using domain segmentation and density-based clustering techniques. It should be noted that the result of a density-based analysis can be presented, for example, on a display for a database administrator to enable manual evaluation and adjustment of a range for a soft correlation.

Aggregate Join Indexes (AJI): AJIs can, for example, be provided as data structures inside the database but external to the original data involving the correlation. AJIs can maintain some computed information derived from the original data, and whenever a record is updated, insert it into, or delete it from the original data. The AJIs can be automatically updated by the database system. If there are no gaps or sparse areas in the density-based analysis, then AJIs can be used to eliminate virtually all violations. by maintaining the global minimum (minRange) and global maximum (maxRange) between the attribute pair involved in the correlation. Whenever the original data is updated (e.g., with an insertion of a new record violating the current minRange and maxRang) the AJI can get updated to accommodate the change.

Figure 4:
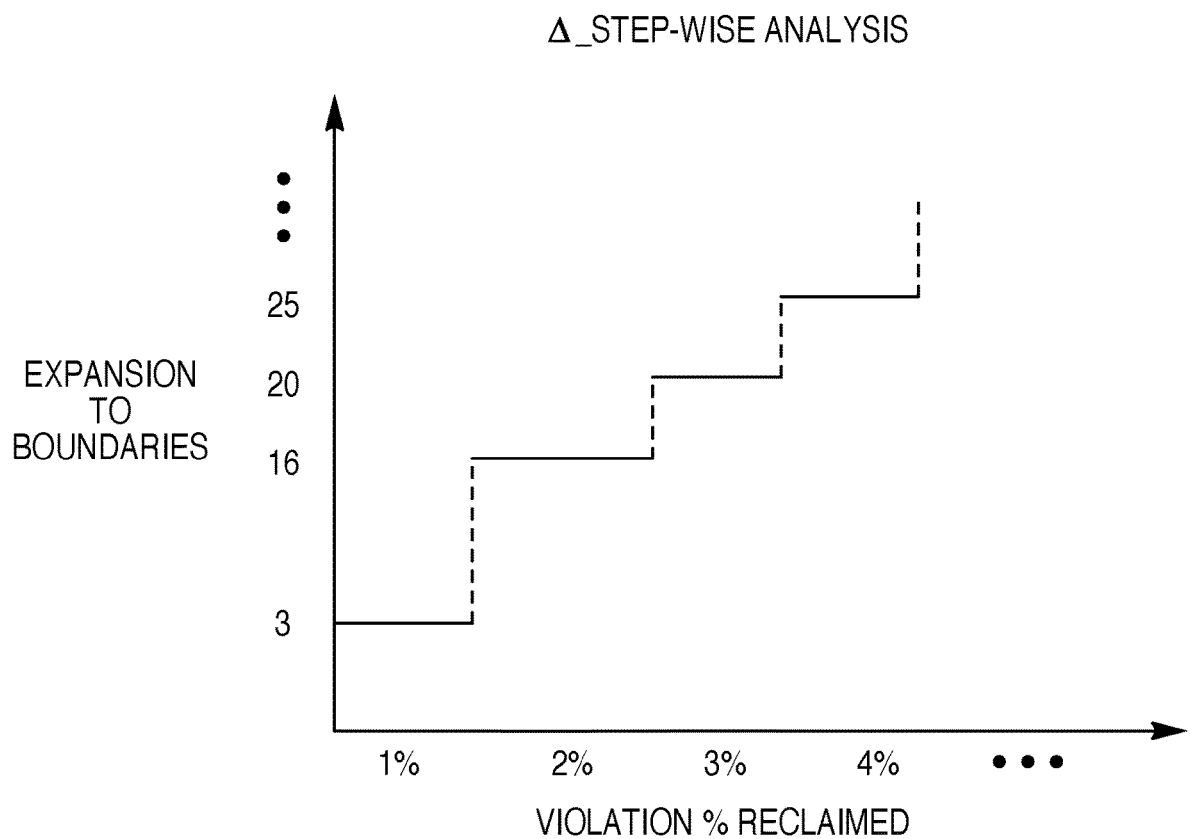
FIG. 4 depicts a view of a step-wise statistics in accordance with one embodiment.

Step-Wise Statistics: Another example is to build step-wise statistics for each of the two sets Δ− and Δ+ as depicted in FIG. 4 in accordance with one embodiment. The x-axis indicates the reclaimed violation % that can be achieved, while the y-axis indicates the expansion that needs to be applied to the mapping expression C.expr.

Upper-Bound Threshold: Yet another example is considering an upper-bound threshold α% for the violations. In this example, the smallest expansion that can be applied to the mapping expression to achieve the desired threshold is determined. It can be a shift applied only to the lower bound (based on Δ−), a shift applied only to the upper bound (based on Δ+), or a combination of the two.

To further elaborate, an exemplary soft correlation for a single-to-list soft correlation that can be obtained by CSA 102 (shown in FIG. 1) in accordance with one embodiment. In the example, "in most cases, CityName" maps to a list of possible "StateName" values via a mapping table." Initially, statistics is collected on volitions. Formally, for a given data record $r \in D$, r is said to violate C if (r.dest not in C.expr(r.src)). In this case, VeMS keeps track of the violating pair along with its frequency of occurrence (r.src, r.dest, count) in a list (say L).

Next, Exploitation for Correlation Tuning is performed. In this case, based on the number or frequency of the violations, it can be determined whether to add a violation to the list of acceptable destinations. For example, if the number of violations of a particular value exceeds a determined or predetermined threshold (e.g., 5% of total) it can be added.

It should be noted that statistics can also be collected for entries that do not violate the single-to-list soft correlation. As such, it may be determined to remove a destination attribute from the range, for example, if its relative frequency appears to be below a determined or predetermined.

As another example, an exemplary soft correlation for a single-to-single soft correlation can be obtained by CSA 102 (shown in FIG. 1) in accordance with one embodiment. In the example, α single-to-single soft correlation can be described as: "In most cases, AirportCode determines City and Country via a mapping table." Similar to the previous example, CSA 102 can collect statistics but in this case rather than adding a value to a set or a list destination attribute, it could effectively overwrite an existing value, for example, if the frequency of volitions exceeds the frequency of the current destination attribute for a particular source value. Given that single-to-single (or singleton-to-singleton) soft correlations allow a value in source attribute to have only one destination mapping (not a set or list of values), SCA 102 can keep track of violation pairs only if the source value is missing from the mapping table. This can be straightforward if the mapping table is known. However, SCA 102 can also work with a "blackbox" mapping function and automatically learn the missing values.

FIG. 5 depicts an exemplary procedure for collecting the violation statistics C for a single-to-single soft correlation in accordance with one embodiment.

As noted above, optimization of the database queries in an important aspect of database systems. To the end, soft correlations can be very useful to optimization of the database queries, especially, in more modern systems. More particularly, semantic query optimization can be a critical type of optimization that database systems perform on a given application according to the semantics and business logic inherent in that application. An important type of semantics is "attribute-pair correlations" in which the value of one attribute (say A) can infer-based on some mapping logic—a corresponding value(s) of a correlated attribute (say B). Attribute-pair correlation could enable a variety of core optimizations that otherwise would be missed, e.g., partition elimination, index-based retrieval, and early detection of unsatisfiability.

However, a key challenge is that in real-world applications many of such attribute-pair correlations are "soft", which means that the database may include some records violating the correlation semantics. For example, "In most cases, ShipDate is within 1 and 120 days from OrderDate", "In most cases, AirportCode uniquely determine City and Country", and "In most cases, FlightTime is within 60 days from FlightPurchaseTime".

Soft correlations are challenging to manage because they can bring to the system both overheads and benefits. To further elaborate, FIG. 6 depicts an exemplary soft correlation in accordance with one embodiment.

Figure 6:
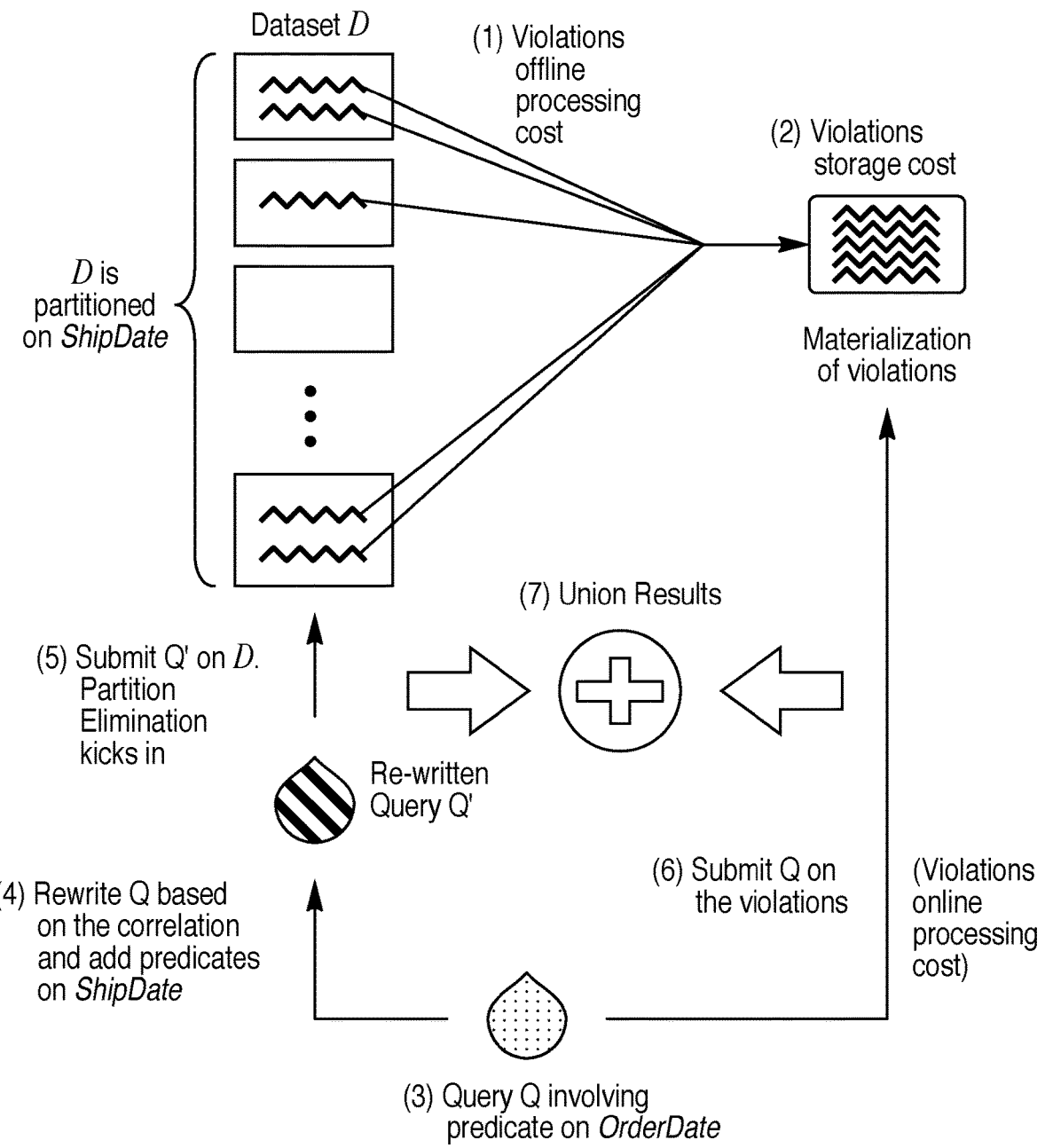
FIG. 6 depicts an exemplary soft correlation in accordance with one embodiment.

Referring to FIG. 6, the overheads can come from (i) identifying and handling the violations before the query time ((1) in FIG. 6) and ii) storage overheads to store the violations separately ((2) in FIG. 6), and (iii) accessing these violations at query time ((6) in FIG. 6). However, query optimization benefits can also be realized, by accessing less data at query time, e.g., by leveraging partition elimination or indexes ((5) in FIG. 6). Making the correlation's mapping expression tighter can be beneficial ((5) in FIG. 6) but it may result in increasing the associated overheads ((1), (2) and (6) in FIG. 6), and vice versa. As such, it will be appreciated that CSA 102 (shown in FIG. 1) can be used to effectively tune the semantics of a soft correlation, thereby maximizing the benefits and minimizing the overheads, which presents a difficult challenge in balancing two contradicting objectives.

Although a conventional "B-Hunt" technique can automatically discover attribute-pair soft correlations, it has at least two limitations. First, it is limited only to numeric and date attributes and to the discovery of simple algebraic relationship between them, i.e., expressions involving a single operator from +, −, *, %, which can be highly restrictive given the increasing complexity of modern databases. Second, with the addition of new data, the discovered correlations lose their balance between the two contradicting objectives highlighted above, and the technique may need to re-execute from scratch. On the other hand, a conventional EXORD technique can allow domain experts to define the soft correlation expressions as "blackbox" mapping functions, which gives a greater flexibility in capturing a wide range of correlations, including those involving complex mapping expressions or metadata lookup. However, it can impose a significant burden on the domain expert to come up with a tight and complete mapping function, which can be error prone and/or may not be practical in at least some cases.

Referring back to FIG. 6, assume the domain experts provide the following correlation: "In most cases, ShipDate is within 1 and 120 days from OrderDate". This semantics may result in many violations, say 30% of the data records are in violation, which leads to disregarding the correlation altogether. However, with a minor change from "120" to "130" the number of violations may significantly drop, say to 2%, which can result in a correlation that is more effective if not highly effective (i.e., the benefits can far exceed the overheads). A key challenge is discovering the optimal balance between the "tightness" and the violations to maximize the benefits of the soft correlation. This capability can be referred to as the "versatility" feature over soft correlations, which is not yet addressed in conventional database systems.

Another conventional technique is discovery and maintenance of attribute-pair correlations referred to as DDCRs (Derived Date Constraints Rules). DDCRs can be hard correlations and may be applicable only to date fields across two tables linked by a referential integrity constraint. A "usefulness" factor can measure how effective the correlation is in reducing the amount of touched data at query time. However DDCR does not directly address the management of soft correlations where violations may exist. More specifically, DDCRs do not have the complexities shown in FIG. 1 (see (1), (2), (6) and (7) in FIG. 1).

Moreover, a SCA 102 (shown in FIG. 1) can provide a broader applicability where it can be applied to soft correlations on any attribute pairs, not only date fields. As such, a SCA 102 can effectively provide a mechanism for versatile management of soft correlations (VeMS). In general, there is no single optimal balance for given a soft correlation C because it can be used in many database queries where each of them may require a different balancing consieration. Therefore, a VeMS mechanism (e.g., SCA 102) can analyze the data and detect the potential of altering the mapping expression to effectively converge to an appropriate balance. As such, a VeMS mechanism can be a critical component in semantic query optimization and could significantly improve the performance of database systems.

In view of the foregoing, one or more of the following can be realized: (1) Introducing a new feature of versatile management of soft correlations, (2) Recognizing that there is no single optimal balance for a given soft correlation because such balance is both query and data dependent, (3) Proposing greedy decisions and heuristics with the aim to converge to an appropriate balance between the correlation's "tightness" and the number of violations, (4) Integrating domain-specific constraints (e.g., the lower bound of the "ShipDate-OrderDate" correlation cannot be negative) that can simplify VeMS's algorithms and guide its search for the appropriate balance, (5) Enabling more optimization opportunities to the database query optimizers because VeMS can revive soft correlations that can be otherwise viewed as useless and get discarded as having higher overheads than benefits, (6) Enabling scalable analytics over applications, including "Big Data" as it brings the overall execution time down by tuning and leveraging these correlations, (7) Applicability to automatically-discovered correlations (as in B-Hunt) as these correlations may lose their good balance under data changes, (8) Applicability to "blackbox" mapping expressions (as in EXORD) as the domain experts best guess can still be way off the appropriate balance but a VeMS mechanism can provide data-driven guidelines to domain experts for adjusting the blackbox mapping functions.

In addition, a VeMS mechanism can be leveraged in various ways to achieve different objective functions, e.g., maximize the tightness of the mapping expression given an upper bound on the number of violations. It can be Assumed that a uni-directional soft correlation C from a source attribute "C.src" to a destination attribute "C.dest" and a mapping expression "C.expr." For a given value s ∈ C.src, C.expr maps s to the "C.dest domain" for example in one of the following forms: 1) Singleton-to-Singleton, 2) Singleton-to-Range, or 3) Singleton-to-List. Since C is soft, there can be violations (exceptions) to C's semantics in the database. Depending on the mapping form, a VeMS mechanism can execute in various ways as for example, described above. It should be noted that a bi-directional correlation can be viewed as two uni-directional correlations.

Generally, the objective of VeMS mechanism is not to eliminate all the violations because this may result in a very loose mapping, e.g., the [1-10 years] range mentioned before, which in turn may reduce the effectiveness of a given correlation in query optimization. For example, using the [1-10 years] range would entirely eliminate the overheads (see (1), (2) and (6) in FIG. 6) because there are no violations. However, this approach would also eliminate the benefits (see (5) in FIG. 6) because no partitions can be eliminated given this wide range. In contrast, the objective is to identify significant violations that can be eliminated with small changes to the correlation's semantics, i.e., maintaining the tightness of the correlation semantics. Therefore, a VeMS mechanism can effectively execute on a random sample of the data instead of the entire dataset because relatively larger violations can be identified from a sample with a high probability.

Figure 7:
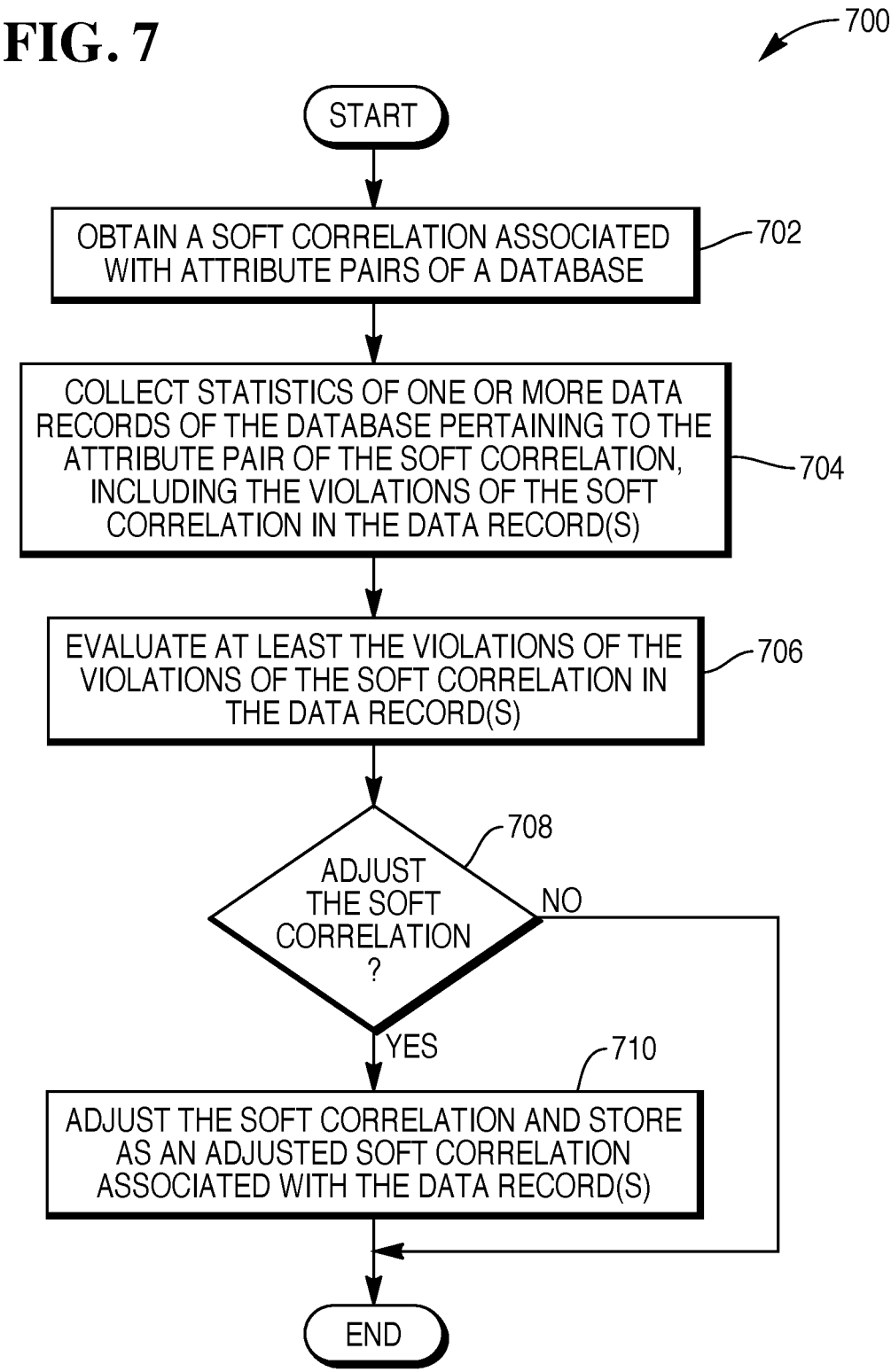
FIG. 7 depicts a method for evaluating a soft correlation of a database in accordance with one embodiment

To elaborate even further, FIG. 7 depicts a method 700 for evaluating a soft correlation of a database in accordance with one embodiment. It should be noted that the soft correlation is associated with attribute pairs of a database that are also associated with data stored in one or more data records of the database. The method 700 can, for example, be provided by the SCA 102 (shown in FIG. 1). As such, the method 700 can be provided as a computer-implemented method using one or more physical processors that execute computer executable code stored in a non-transitory medium as will be appreciated by those skilled in the art.

Referring to FIG. 7, initially, a soft correlation associated with attribute pairs of a database is obtained (702). Next, statistics of one or more data records of the database pertaining to the attribute pairs of the soft correlation are collected (704). It should be noted that collected data includes at least the violations of the soft correlation in the one or more records. However, it should be noted that data pertaining to non-violating instances can also be collected. Further, data collection can be made with respect to the entire data of the one or more data records, or only a sample of the data of the one or more data records can be collected. In any case, after the statistics are collected (704), the collected statistics can be evaluated (706). In other words, at least the collected statistics pertaining to the violations of the soft correlation in the data record(s) can be evaluated. Thereafter, it is determined (708) whether to adjust the soft correlation based on the evaluation of the collected statistics (706). Accordingly, the soft correlation can be adjusted (710) if it is determined (808) to adjust the soft correlation based on the evaluation of the collected statistics (706) before the method 700 ends. The method 700 also ends if it determined (708) not to adjust the soft correlation, based on the evaluation of the collected statistics (706).

Figure 8A:
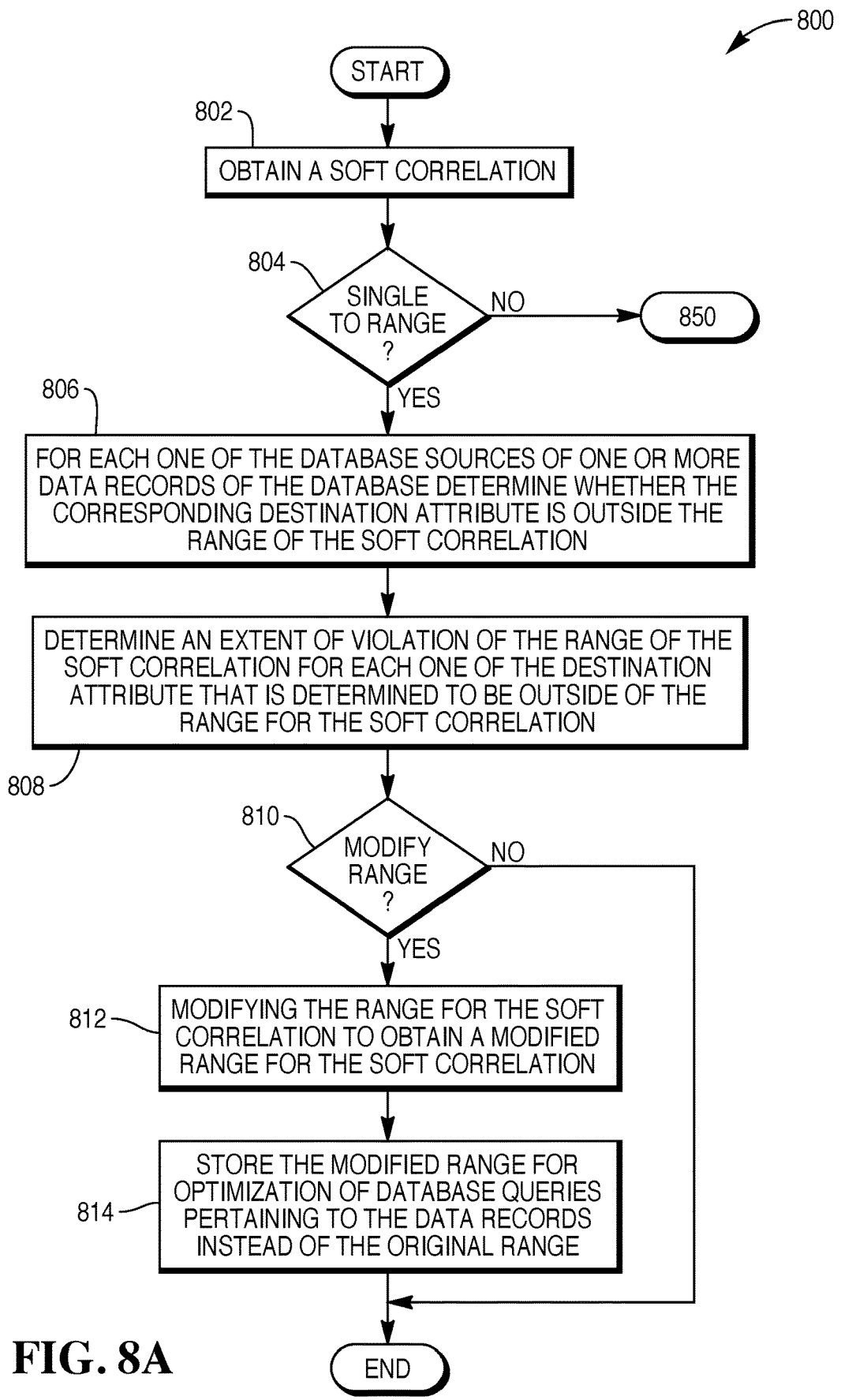
FIGS. 8A-C depict a method for providing a soft correlation in connection with optimizing one or more database queries of a database in accordance with one embodiment
Figure 8B:
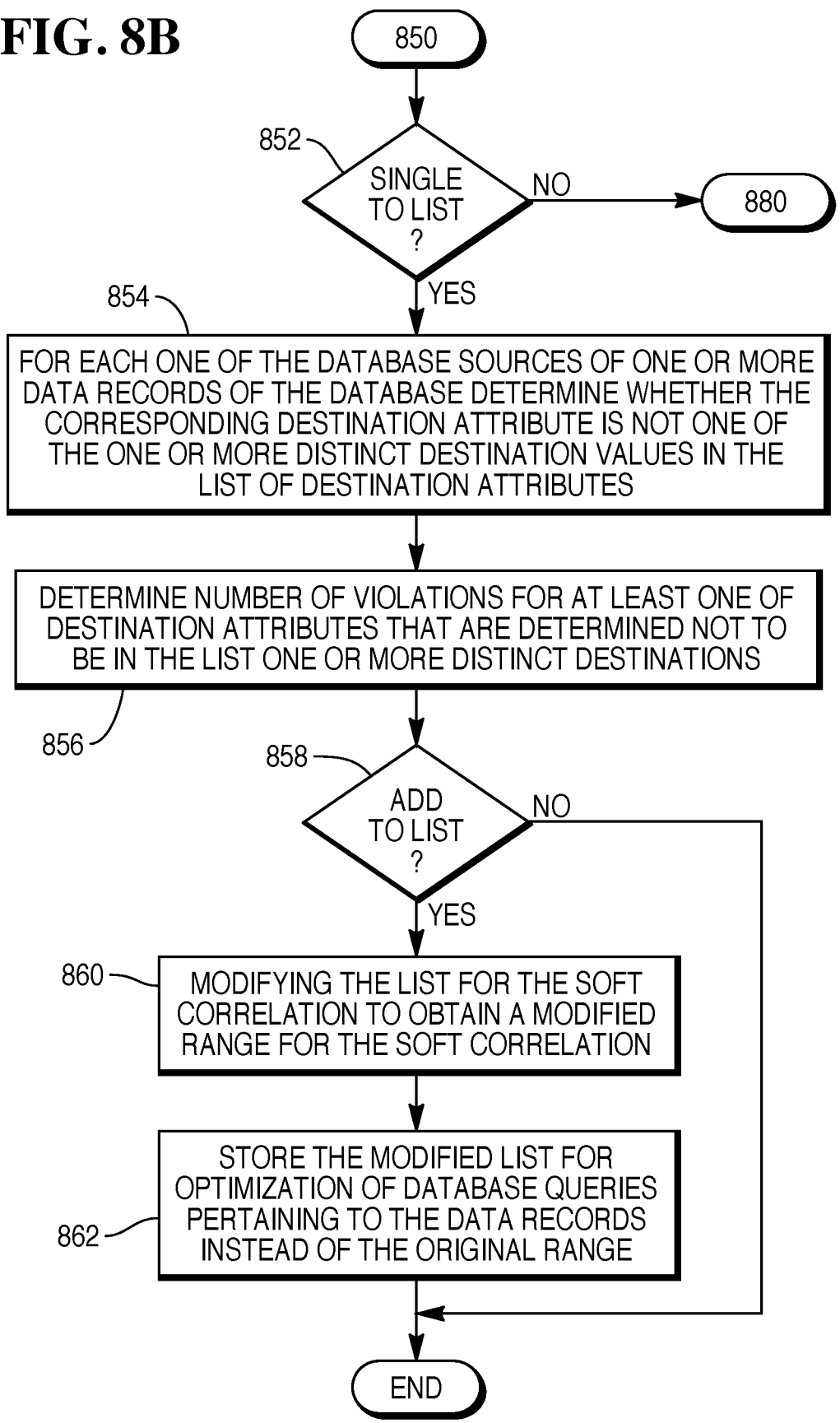
Figure 8C:
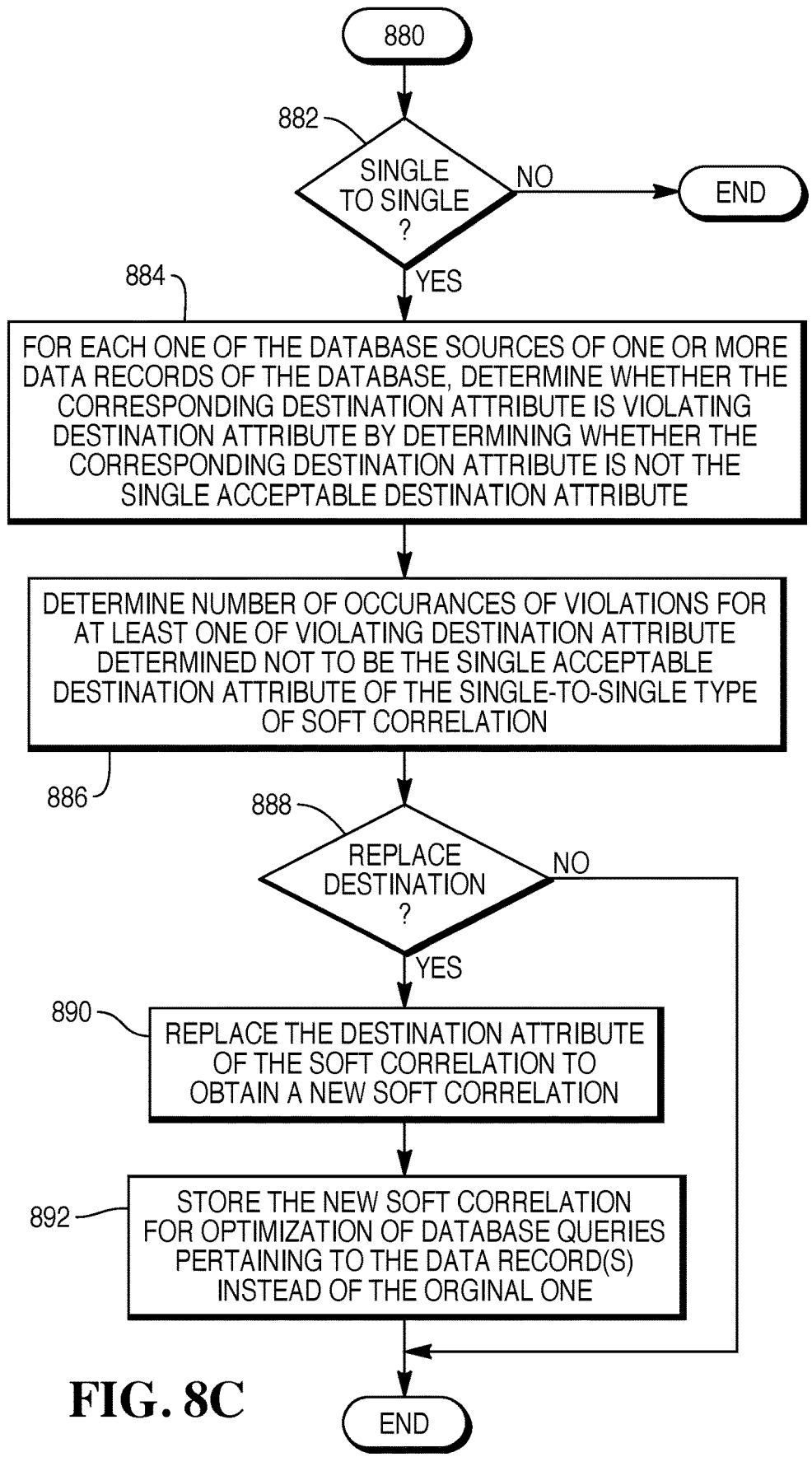

FIGS. 8A-C depict a method 800 for providing a soft correlation in connection with optimizing one or more database queries of a database in accordance with one embodiment. It should be noted that the soft correlation is associated with attribute pairs of a database that are also associated with data stored in one or more data records of the database. The method 800 can, for example, be provided by the SCA 102 (shown in FIG. 1). As such, the method 800 can be provided as a computer-implemented method using one or more physical processors that execute computer executable code stored in a non-transitory medium as will be appreciated by those skilled in the art.

Referring to FIG. 8A, initially, a soft correlation is obtained (802). Next, it is determined (804) if the soft correlation is a single-to-range type of correlation. If it determined (804) that the soft correlation is not a single-to-range type of correlation, the method 800 can proceed to determine (850) if the soft correlation is a single-to-list type of correlation (shown in FIG. 8B). However, if it is determined (804) if the soft correlation is a single-to-range type of correlation, for each one of the database sources of one or more data records of the database it can be determined (806) whether the corresponding destination attribute is outside of the range of the soft correlation. Next, an extent of violation of the range of the soft correlation is determined (808) for each one of the destination attribute that is determined to be outside of the range for the soft correlation. For example, it can be determined how many violations occur at a given point outside the acceptable range (e.g., density of the violations can be determined). Thereafter, based on the extent of the violations, it can be determined (810) whether to modify the range. For example, the determination (810) can be made based on at least one of the following: (i) density of the violations of the range of the soft correlation, wherein the density of the violations of the range is determined at least partly based on analyzing the extent of violation of the range of the soft correlation, and (ii) a threshold of allowed violations of the range for the soft correlation. Accordingly, the range can be modified (812) and stored (814) as a modified range for optimization of database queries pertaining to the data record(s) instead of the original range (i.e., the modified range effectively replaces the original range when database queries pertaining to the data records associated with the soft correlation are optimized) before the method 800 ends.

Referring now to FIG. 8B, it can be determined (852) whether the soft correlation is a single-to-list type of correlation. It should be noted that a single-to-list type of soft correlation maps a single source database attribute to a list of destination attributes, wherein the list of destination attributes consists of one or more distinct destination values that are acceptable for the soft correlation. If it is determined (852) the soft correlation is not a single to list type of correlation, the method 800 can proceed to operation 880 (shown in FIG. 8C).

However, if it is determined (852) that the soft correlation is a single to list type of correlation, for each one of the database sources of one or more data records of the database it can be determined (854) whether the corresponding destination attribute is not one of the one or more distinct destination values in the list of destination attributes. Next, number of violations is determined (856) for at least one of destination attributes that are determined not to be in the list one or more distinct destinations of the single-to-list type of soft correlation. Thereafter, it can be determined (858) based on the number of violations whether to add the destination attribute to the list of the single-to-list type of soft correlation. Accordingly, the destination attribute can be added to list to obtain (860) a modified list for the soft correlation and the modified list can be stored (862) for optimization of database queries pertaining to the data records instead of the original list before the method 800 ends.

Although not shown in FIG. 8B, it should be noted that additionally statistics can be collected for destination attribute that are in the list (i.e., not violating the soft correlation). As a result, a destination attribute can be removed from the list, for example, based on the determination that its relative frequency is deemed to be too low for continuing to be in the list.

Referring to FIG. 8C, it is determined (882) whether the soft correlation is a single-to-single type of correlation. If it is determined (882) that the soft correlation is not a single-to-single type of correlation, the method 800 can end. However, if it is determined (882) that the soft correlation is a single-to-single type of correlation, for each one of the database sources of one or more data records of the database, it can be determined (884) whether the corresponding destination attribute is a violating destination attribute by determining whether the corresponding destination attribute is not the single acceptable destination attribute. Next, number of occurrences of violations can be determined (886) for at least one of the violating destination attributes determined (884) not to be the single acceptable destination attribute of the single-to-single type of soft correlation. Thereafter, it can be determined (888) based on the determined (886) number of occurrences (or frequency) of violations whether to replace the destination attribute. Typically, if the frequency of a violating destination exceeds the acceptable destination of the soft correlation, it can be determined (888) to replace the acceptable destination by the violating destination. In effect, a new soft correlation can result by replacing the destination attribute. Referring back to FIG. 8C, the destination attribute of the soft correlation can be replaced to obtain (890) a new soft correlation. The new soft correlation can then be stored (892) for optimization of database queries pertaining to the data record(s) instead of the original soft correlation before the method 800 ends.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system, comprising:
memory, and
one or more processors configured to access the memory, wherein the one or more processors are further configured to:
obtain a soft correlation associated with attribute pairs of a database, wherein the soft correlation is one of the following: (i) a single-to-range type of soft correlation, (ii) a single-to-list type of soft correlation, and (iii) a single-to-single type of a soft correlation;
collect statistics of one or more data records of the database pertaining to the attribute pairs of the soft correlation as collected statistics, wherein the collected statistics includes one or more violations of the soft correlation in the one or more data records of the database;
evaluate at least the one or more violations of the soft correlation in the one or more data records of the database;
determine, based on the evaluation of the one or more violations of the soft correlation, whether to adjust the soft correlation for the one or more data records of the database, wherein the one or more processors are further configured to:
determine that the soft correlation corresponds to a single-to-range type of soft correlation, wherein the single-to-range type of soft correlation maps a single source database attribute to a range of acceptable destination database attributes indicative of a range between a beginning of the range attribute and an end of range attribute;
determine an extent of violations of the range of the soft correlation based on at least one of the following:
(i) density of the violations of the range of the soft correlation, and
(ii) a threshold of allowed violations of the range for the soft correlation;

adjust the soft correlation for the one or more data records of the database as an adjusted soft correlation when the determining determines to adjust the soft correlation for the one or more data records of the database; and
store the adjusted soft correlation in the memory.

2. A computing system, comprising:
memory, and
one or more processors configured to access the memory, wherein the one or more processors are further configured to:
obtain a soft correlation associated with attribute pairs of a database, wherein the soft correlation is one of the following: (i) a single-to-range type of soft correlation, (ii) a single-to-list type of soft correlation, and (iii) a single-to-single type of a soft correlation;
collect statistics of one or more data records of the database pertaining to the attribute pairs of the soft correlation as collected statistics, wherein the collected statistics includes one or more violations of the soft correlation in the one or more data records of the database;
evaluate at least the one or more violations of the soft correlation in the one or more data records of the database;
determine, based on the evaluation of the one or more violations of the soft correlation, whether to adjust the soft correlation for the one or more data records of the database, wherein the one or more processors are further configured to:
determine that the soft correlation corresponds to a single-to-list type of soft correlation, wherein the single-to-list type of soft correlation maps a single source database attribute to a list of destination attributes, wherein the list of destination attributes consists of one or more distinct destination values that are acceptable for the soft correlation;
determine a number of violations for at least one of destination attributes that are determined not to be in the list one or more distinct destinations of the single-to-list type of soft correlation;
determine, based on the number of violations for the at least one of destination attributes, whether to add the at least one of destination attributes to the list of the single-to-list type of soft correlation; and
add the at least one of the destination attributes to the list of one or more distinct destinations of the single-to-list type of soft correlation to obtain a modified single-to-list soft correlation when it is determined to add the at least one of destination attributes to the list of the single-to-list type of soft correlation;
adjust the soft correlation for the one or more data records of the database as an adjusted soft correlation when the determining determines to adjust the soft correlation for the one or more data records of the database; and
store the adjusted soft correlation in the memory.

3. A computing system, comprising:
memory, and
one or more processors configured to access the memory, wherein the one or more processors are further configured to:
obtain a soft correlation associated with attribute pairs of a database, wherein the soft correlation is one of the following: (i) a single-to-range type of soft correlation, (ii) a single-to-list type of soft correlation, and (iii) a single-to-single type of a soft correlation;
collect statistics of one or more data records of the database pertaining to the attribute pairs of the soft correlation as collected statistics, wherein the collected statistics includes one or more violations of the soft correlation in the one or more data records of the database;

evaluate at least the one or more violations of the soft correlation in the one or more data records of the database;

determine, based on the evaluation of the one or more violations of the soft correlation, whether to adjust the soft correlation for the one or more data records of the database, wherein the one or more processors are further configured to:

determine that the soft correlation corresponds to a to a single-to-single type of soft correlation, wherein the single-to-single type of soft correlation maps a single source database attribute to a single acceptable destination attribute;

determine, for each one of the database sources of one or more data records of the database, whether the corresponding destination attribute is a violating destination attribute by at least determining whether the corresponding destination attribute is not the single acceptable destination attribute;

determine a number of occurrences of violations for at least one of violating destination attribute determined not to be the single acceptable destination attribute of the single-to-single type of soft correlation;

determine, based on the number of occurrences of the violations for the at least one of destination attributes, whether to replace the single acceptable destination attribute of the single-to-single type of soft correlation by the violating destination attribute determined not to be the single acceptable; and replace the single acceptable destination attribute of the single-to-single type of soft correlation by the destination attribute determined not to be the single acceptable to obtain a modified single-to-single type of soft correlation when it is determined to replace the single acceptable destination attribute of the single-to-single type of soft correlation;

adjust the soft correlation for the one or more data records of the database as an adjusted soft correlation when the determining determines to adjust the soft correlation for the one or more data records of the database; and store the adjusted soft correlation in the memory.

4. A computer-implemented method of optimizing execution of one or more database queries of a database system, wherein the database system includes one or more processors operable to access data stored in data records in a database by processing the one or more database queries, and wherein the computer-implemented method comprises:

obtaining, by the one or more processors of the database system, source and destination database attribute-pairs associated with a soft correlations between source and destination database attribute-pairs of the database system, wherein the source and destination database attribute-pairs are determined based on a mapping expression between the source and destination database attribute-pairs;

(a) determining a type for the soft correlation associated with the obtained source and destination database attribute-pairs, wherein the type of the soft correlation includes: (i) a single-to-range type of soft correlation, (ii) a single-to-list type of soft correlation, and (iii) a single-to-single type of a soft correlation;

(b) determining whether the obtained source and destination database attribute-pairs of the soft correlation correspond to a single-to-range type of soft correlation, wherein the single-to-range type of soft correlation maps a single source database attribute to a range of acceptable destination database attributes indicative of a range between a beginning and an end of range attribute;

(c) determining, for each one of the database sources of one or more data records of the database, whether the corresponding destination attribute is outside of the range of the soft correlation when the determining (b) determines that the source and destination database attribute-pairs of the soft correlation correspond to a single-to-range type of soft correlation;

(d) determining an extent of violations of the range of the soft correlation for each one of the destination attribute that is determined (c) to be outside of the range for the soft correlation;

(e) determining based on the extent of the violations of the range whether to modify the range for the soft correlation; and modifying the range for the soft correlation to obtain a modified range for the soft correlation to obtain a modified single-to-range soft correlation when the determining (e) determines to modify the range for the soft correlation; and storing the modified range for the soft correlation with the modified range for optimizing the execution of one or database queries when the determining (e) determines to modify the range for the soft correlation.

5. The computer-implemented method of claim 4, wherein the computer-implemented further comprises:

optimizing the execution of one or more database queries based on the modified range for the modified single-to-range soft correlation when the determining (e) determines to modify the range for the soft correlation.

6. The computer-implemented method of claim 4, wherein the determining (c) of whether the corresponding destination attribute is outside of the range of the soft correlation is made at least based on one or more of the following:

(i) density of the violations of the range of the soft correlation, wherein the density of the violations of the range is determined at least partly based on analyzing the extent of violation of the range of the soft correlation, and (ii) a threshold of allowed violations of the range for the soft correlation.

7. The computer-implemented method of claim 4, wherein the computer-implemented method further comprises:

collecting additional statistics of the one or more data records for destination attributes that does not violate the soft correlation; and adjusting the range based on the collected additional statistics.

8. The computer-implemented method of claim 4, wherein the computer-implemented method further comprises:

determining that the source and destination database attribute-pairs of the soft correlation correspond to a single-to-list type of soft correlation, wherein the single-to-list type of soft correlation maps a single source database attribute to a list of destination attributes, wherein the list of destination attributes consists of one or more distinct destination values that are acceptable for the soft correlation;

for each one of the database sources of one or more data records of the database determining whether the corresponding destination attribute is not one of the one or more distinct destination values in the list of destination attributes;

determining a number of violations for at least one of destination attributes that are determined not to be in the list one or more distinct destinations of the single-to-list type of soft correlation;

determining, based on the number of violations for the at least one of destination attributes, whether to add the at least one of destination attributes to the list of the single-to-list type of soft correlation; and adding the at least one of the destination attributes to the list of one or more distinct destinations of the single-to-list type of soft correlation to obtain a modified single-to-list soft correlation when the determining determines to add the at least one of destination attributes to the list of the single-to-list type of soft correlation.

9. The computer-implemented method of claim 8, wherein the computer-implemented method further comprises:

optimizing the execution of one or more database queries based on the modified range for the modified single-to-range soft correlation when the determining (e) determines to modify the range for the soft correlation.

10. The computer-implemented method of claim 8, wherein the computer-implemented method further comprises:

collecting additional statistics of the one or more data records for destination attributes that does not violate the soft correlation; and adjusting the range based on the collected additional statistics.

11. The computer-implemented method of claim 4, wherein the computer-implemented method further comprises:

determining that the source and destination database attribute-pairs of the soft correlation correspond to a single-to-single type of soft correlation, wherein the single-to-single type of soft correlation maps a single source database attribute to a single acceptable destination attribute;

for each one of the database sources of one or more data records of the database, determining whether the corresponding destination attribute is a violating destination attribute by at least determining whether the corresponding destination attribute is not the single acceptable destination attribute;

determining a number of occurrences of violations for at least one of violating destination attribute determined not to be the single acceptable destination attribute of the single-to-single type of soft correlation;

determining, based on the number of occurrences of the violations for the at least one of destination attributes, whether to replace the single acceptable destination attribute of the single-to-single type of soft correlation by the violating destination attribute determined not to be the single acceptable; and replacing the single acceptable destination attribute of the single-to-single type of soft correlation by the destination attribute determined not to be the single acceptable to obtain a new single-to-single type of soft correlation when the determining determines to replace the single acceptable destination attribute of the single-to-single type of soft correlation.

12. The non-transitory computer readable storage medium storing at least computer executable code that when executed by a computer performs at least the followings:

obtains a soft correlation associated with attribute pairs of a database;

collects statistics of one or more data records of the database pertaining to the attribute pair of the soft correlation as collected statistics, wherein the collected statistics includes one or more violations of the soft correlation in the one or more data records of the database; and evaluates at least the one or more violations of the soft correlation in the one or more data records of the database;

determines, based on the evaluation of the one or more violations of the soft correlation, whether to adjust the soft correlation for the one or more data records of the database, wherein the computer executable code when executed by a computer further performs at least the followings:

determines that the soft correlation corresponds to a single-to-range type of soft correlation, wherein the single-to-range type of soft correlation maps a single source database attribute to a range of acceptable destination database attributes indicative of a range between a beginning of the range attribute and an end of range attribute;

determines an extent of violations of the range of the soft correlation based on at least one of the following:

(i) density of the violations of the range of the soft correlation, and (ii) a threshold of allowed violations of the range for the soft correlation;

adjusts the soft correlation for the one or more data records of the database as an adjusted soft correlation when it is determined to adjust the adjust the soft correlation for the one or more data records of the database; and store the adjusted soft correlation in the memory.

13. The non-transitory computer readable storage medium storing at least computer executable code that when executed by a computer performs at least the followings:

obtains a soft correlation associated with attribute pairs of a database;

collects statistics of one or more data records of the database pertaining to the attribute pair of the soft correlation as collected statistics, wherein the collected statistics includes one or more violations of the soft correlation in the one or more data records of the database; and evaluates at least the one or more violations of the soft correlation in the one or more data records of the database;

determines, based on the evaluation of the one or more violations of the soft correlation, whether to adjust the soft correlation for the one or more data records of the database, wherein the computer executable code when executed by a computer further performs at least the followings:

determines that the soft correlation corresponds to a single-to-list type of soft correlation, wherein the single-to-list type of soft correlation maps a single source database attribute to a list of destination attributes, wherein the list of destination attributes consists of one or more distinct destination values that are acceptable for the soft correlation;

determines a number of violations for at least one of destination attributes that are determined not to be in the list one or more distinct destinations of the single-to-list type of soft correlation;

determines, based on the number of violations for the at least one of destination attributes, whether to add the at least one of destination attributes to the list of the single-to-list type of soft correlation; and adds the at least one of the destination attributes to the list of one or more distinct destinations of the single-to-list type of soft correlation to obtain a modified single-to-list soft correlation when it is determined to add the at least one of destination attributes to the list of the single-to-list type of soft correlation;

adjusts the soft correlation for the one or more data records of the database as an adjusted soft correlation when it is determined to adjust the adjust the soft correlation for the one or more data records of the database; and store the adjusted soft correlation in the memory.

14. The non-transitory computer readable storage medium storing at least computer executable code that when executed by a computer performs at least the followings:

obtains a soft correlation associated with attribute pairs of a database;

collects statistics of one or more data records of the database pertaining to the attribute pair of the soft correlation as collected statistics, wherein the collected statistics includes one or more violations of the soft correlation in the one or more data records of the database; and evaluates at least the one or more violations of the soft correlation in the one or more data records of the database;

determines, based on the evaluation of the one or more violations of the soft correlation, whether to adjust the soft correlation for the one or more data records of the database, wherein the computer executable code when executed by a computer further performs at least the followings:

determines that the soft correlation corresponds to a to a single-to-single type of soft correlation, wherein the single-to-single type of soft correlation maps a single source database attribute to a single acceptable destination attribute;

determines, for each one of the database sources of one or more data records of the database, whether the corresponding destination attribute is a violating destination attribute by at least determining whether the corresponding destination attribute is not the single acceptable destination attribute;

determines a number of occurrences of violations for at least one of violating destination attribute determined not to be the single acceptable destination attribute of the single-to-single type of soft correlation;

determines, based on the number of occurrences of the violations for the at least one of destination attributes, whether to replace the single acceptable destination attribute of the single-to-single type of soft correlation by the violating destination attribute determined not to be the single acceptable; and replaces the single acceptable destination attribute of the single-to-single type of soft correlation by the destination attribute determined not to be the single acceptable to obtain a modified single-to-single type of soft correlation when it is determined to replace the single acceptable destination attribute of the single-to-single type of soft correlation;

adjusts the soft correlation for the one or more data records of the database as an adjusted soft correlation when it is determined to adjust the adjust the soft correlation for the one or more data records of the database; and store the adjusted soft correlation in the memory.

* * * * *